Figure 1:
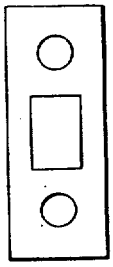
Figure 2:
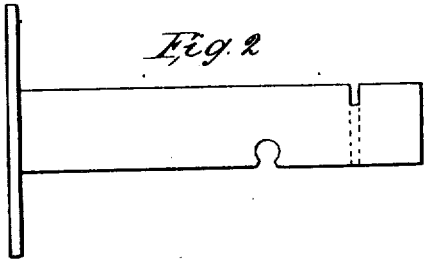
Figure 3:
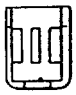
Figure 4:
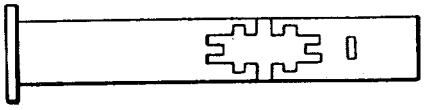
Figure 5:
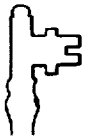
Figure 6:
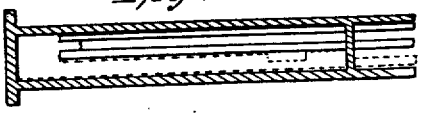
Figure 7:
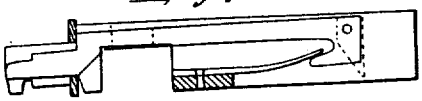
Figure 8:
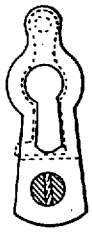

No Printed Specification Available

9370½X

P. & E. W. Blake,

Lock.

Patented Feb. 6, 1836.

AM. PHOTO-LITHO. CO. N.Y. (OSBORNE'S PROCESS)

TEMPORARY NOTICE of BEST AVAILABLE IMAGE

U. S. PATENT AND TRADEMARK OFFICE

---

THE SCANNED IMAGES OF PATENT NUMBER 9370 1/2 X FOR THE ISSUE DATE OF

2/6/1836 ARE NOT THE COMPLETE ORIGINAL

DOCUMENT, BUT CONTAIN A COPY OF THE BEST

AVAILABLE TEXT AND IMAGE DATA FROM VARIOUS

SOURCES.

WHEN THE MISSING INFORMATION BECOMES AVAILABLE,

THE DOCUMENT WILL BE RESCANNED AND REPLACED.

ANY QUESTIONS SHOULD BE DIRECTED TO THE DATA

MAINTENANCE BRANCH BY TELEPHONE AT (703) 306-3116.

---

TEMPORARY NOTICE of BEST AVAILABLE IMAGE